United States Patent
Gavade et al.

(10) Patent No.: US 10,966,278 B2
(45) Date of Patent: Mar. 30, 2021

(54) CHANNEL ACQUISITION MANAGEMENT

(71) Applicant: Verizon Patent and Licensing Inc., Arlington, VA (US)

(72) Inventors: Sameer Gavade, Irving, TX (US); Sanjay Ahuja, Irving, TX (US); Venkata S. Adimatyam, Irving, TX (US); Binayak Biswal, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 247 days.

(21) Appl. No.: 15/283,612

(22) Filed: Oct. 3, 2016

(65) Prior Publication Data

US 2018/0097741 A1    Apr. 5, 2018

(51) Int. Cl.
| | |
|---|---|
| *H04W 76/34* | (2018.01) |
| *H04N 21/658* | (2011.01) |
| *H04N 21/2387* | (2011.01) |
| *H04N 21/472* | (2011.01) |
| *H04N 21/262* | (2011.01) |
| *H04N 21/239* | (2011.01) |
| *H04L 29/06* | (2006.01) |
| *H04L 12/26* | (2006.01) |

(52) U.S. Cl.
CPC ............ *H04W 76/34* (2018.02); *H04L 43/10* (2013.01); *H04L 43/16* (2013.01); *H04L 65/4084* (2013.01); *H04L 65/602* (2013.01); *H04N 21/2387* (2013.01); *H04N 21/2396* (2013.01); *H04N 21/26216* (2013.01); *H04N 21/47202* (2013.01); *H04N 21/6582* (2013.01)

(58) Field of Classification Search
None
See application file for complete search history.

(56) References Cited

U.S. PATENT DOCUMENTS

| | | | |
|---|---|---|---|
| 9,060,208 B2* | 6/2015 | Rieger | H04N 21/2402 |
| 9,392,312 B1* | 7/2016 | Lewis | H04N 21/266 |
| 9,838,455 B2* | 12/2017 | Einarsson | H04L 65/607 |
| 2008/0170527 A1* | 7/2008 | Lundsgaard | H04L 12/1863 370/312 |
| 2013/0133022 A1* | 5/2013 | Bi | H04N 21/4432 725/152 |
| 2013/0211567 A1* | 8/2013 | Oganesyan | H04L 65/4076 700/94 |

(Continued)

OTHER PUBLICATIONS

Rafael et al. Dynamic Resource Allocation and Advertisement Revenue Optimization for TV Over eMBMS, Sep. 2016, IEEE (Year: 2016).*

*Primary Examiner* — Aaron N Strange
*Assistant Examiner* — Mohammad Yousuf A. Mian

(57) ABSTRACT

A device may receive information that identifies a request, by a user device, to receive streaming media content associated with a channel. The device may cause the channel to be activated based on the request. The device may receive, from the user device, a quantity of messages based on the channel being activated. The user device may receive the streaming media content associated with the channel. The device may determine, based on the quantity of messages, that the user device is not tuned to the channel. The device may cause the channel to be deactivated based on the user device not being tuned to the channel.

20 Claims, 10 Drawing Sheets

(56) References Cited

U.S. PATENT DOCUMENTS

| | | | | |
|---|---|---|---|---|
| 2015/0358677 | A1* | 12/2015 | Papa | H04N 21/2541 |
| | | | | 725/14 |
| 2017/0188054 | A1* | 6/2017 | Ma | H04L 67/2814 |
| 2018/0014077 | A1* | 1/2018 | Hou | H04N 21/458 |

* cited by examiner

US 10,966,278 B2

CHANNEL ACQUISITION MANAGEMENT

BACKGROUND

Customer devices (e.g., television set-top boxes, or the like) may receive both traditional television signals, via a dedicated connection, and Internet protocol (IP)-based data services, via an Internet connection. Video content delivered to the customer devices via an IP-based packet network may be referred to as over-the-top (OTT) delivery. OTT video content may include, for example, live content streams, pre-recorded video content (e.g., television episodes, movies, etc.), and content associated with video portals provided by content providers.

DETAILED DESCRIPTION OF PREFERRED EMBODIMENTS

The following detailed description of example implementations refers to the accompanying drawings. The same reference numbers in different drawings may identify the same or similar elements.

A telecommunications provider may provide Internet Protocol Television (IPTV) services to subscribers. As part of offering the IPTV services, acquisition and/or encoding devices (e.g., server devices) may receive signal streams from various content sources (e.g., signal streams associated with streaming media content, such as video content). Additionally, the acquisition and/or encoding devices may transcode the signals using a particular codec, such as a Motion Pictures Experts Group (MPEG) codec (e.g., MPEG-4), and may partition the streaming media content into multiple files (e.g., transport stream (TS) files). Additionally, origin servers and/or content delivery network (CDN) servers may store (e.g., cache) the files associated with the streaming media content, thereby enabling user devices to request and receive the streaming media content (e.g., using IP infrastructure). Further, the above devices may need to transcode and distribute streaming media content for a wide variety of content sources (e.g., channels).

In some cases, a viewership quantity associated with a channel (e.g., a quantity of user devices that are tuned to, or accessing, a particular channel) may be low (e.g., may include zero viewers, may include a relatively low number of viewers as compared to other channels, etc.). However, in such cases, the acquisition and/or encoding devices may continue to acquire and encode the signal stream associated with the channel, and origin servers and/or CDN servers may continue to store the streaming media content despite low and/or non-existent distribution. As such, device resources and/or network resources may be imprudently consumed as part of the acquisition, encoding, and/or storage processes associated with a channel having a low viewership.

Implementations described herein enable a management device to maintain information regarding current viewership of a channel, and cause other devices to activate and/or deactivate the acquisition, encoding, and/or storage processes based on the viewership information. In this way, resources that would have been otherwise used for acquisition, encoding, and/or storage of content are conserved. For example, a quantity of instances of acquiring content, encoding the content, storing, and/or transmitting the encoded content may be reduced, thereby conserving network and/or computing resources.

FIGS. 1A-1G are diagrams of an overview of an example implementation 100 described herein. As described herein, FIGS. 1A-1G illustrate the activation and deactivation of a channel for content streaming based on a viewership level for the channel.

Figure 1A:
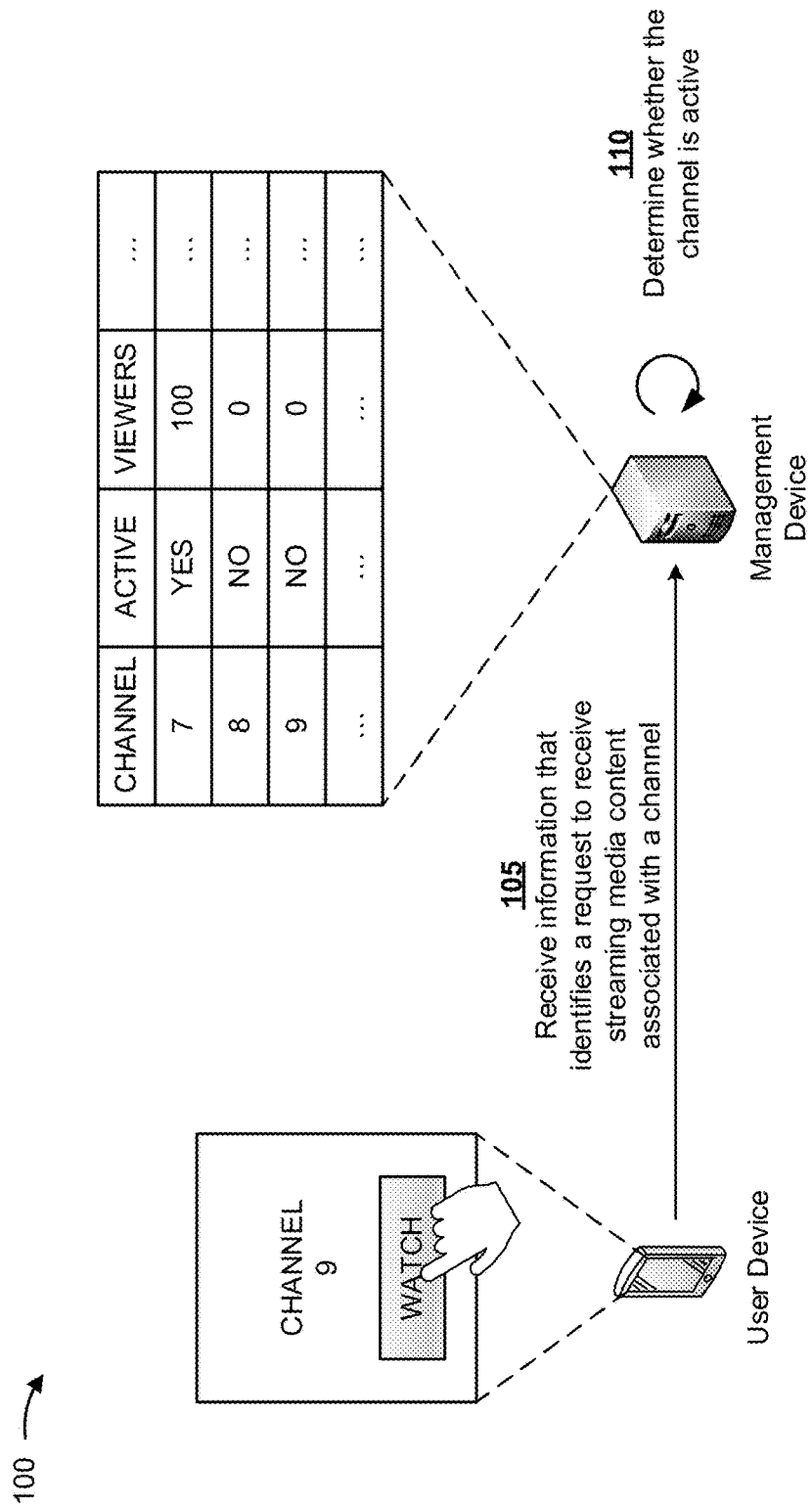
FIGS. 1A-1G are diagrams of an overview of an example implementation described herein.

As shown in FIG. 1A, a user device may receive input identifying a selection to tune to a particular channel (e.g., a request to receive streaming media content associated with "Channel 9"). Based on receiving the input, the user device may provide information that identifies the request to receive streaming media content associated with the channel. As shown by reference number 105, a management device may receive the request, and as shown by reference number 110, the management device may determine whether the channel is active. For example, the management device may store a data structure indicating whether the channel, identified in the request, is active. As described elsewhere herein, a channel may be activated (or deactivated) based on a quantity of viewers tuned to the channel. In the example shown, the channel identified in the request (e.g., "Channel 9") is not currently active. Accordingly, the management device may determine that the channel identified in the request is not active.

Figure 1B:
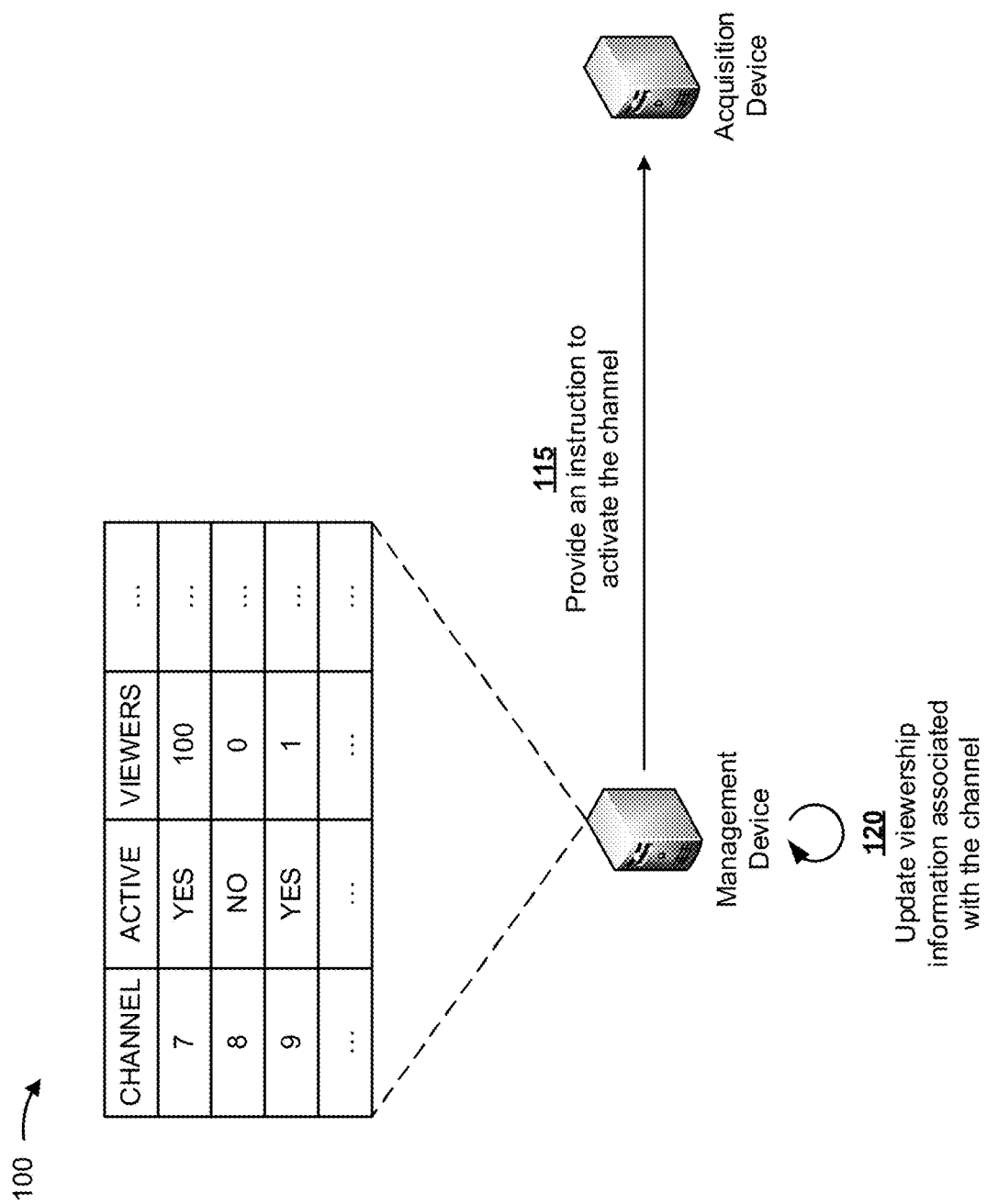

As shown in FIG. 1B, and by reference number 115, the management device may provide, to an acquisition device (e.g., a server device), an instruction to activate the channel. For example, the management device may provide the instruction based on determining that the channel identified in the request is not currently active. In some implementations, activating the channel may refer to the process of acquiring a stream (e.g., associated with a content source), and storing streaming media content, associated with the stream, for distribution to user devices. As shown by reference number 120, the management device may update viewership information associated with the channel. For example, when the management device provides the instruction to activate the channel, the management device may update viewership information associated with the channel (e.g., as shown in the data structure). In the example shown in FIG. 1B, the management device may update the viewership information to reflect that one user device is tuned to channel 9, and that channel 9 is active.

Figure 1C:
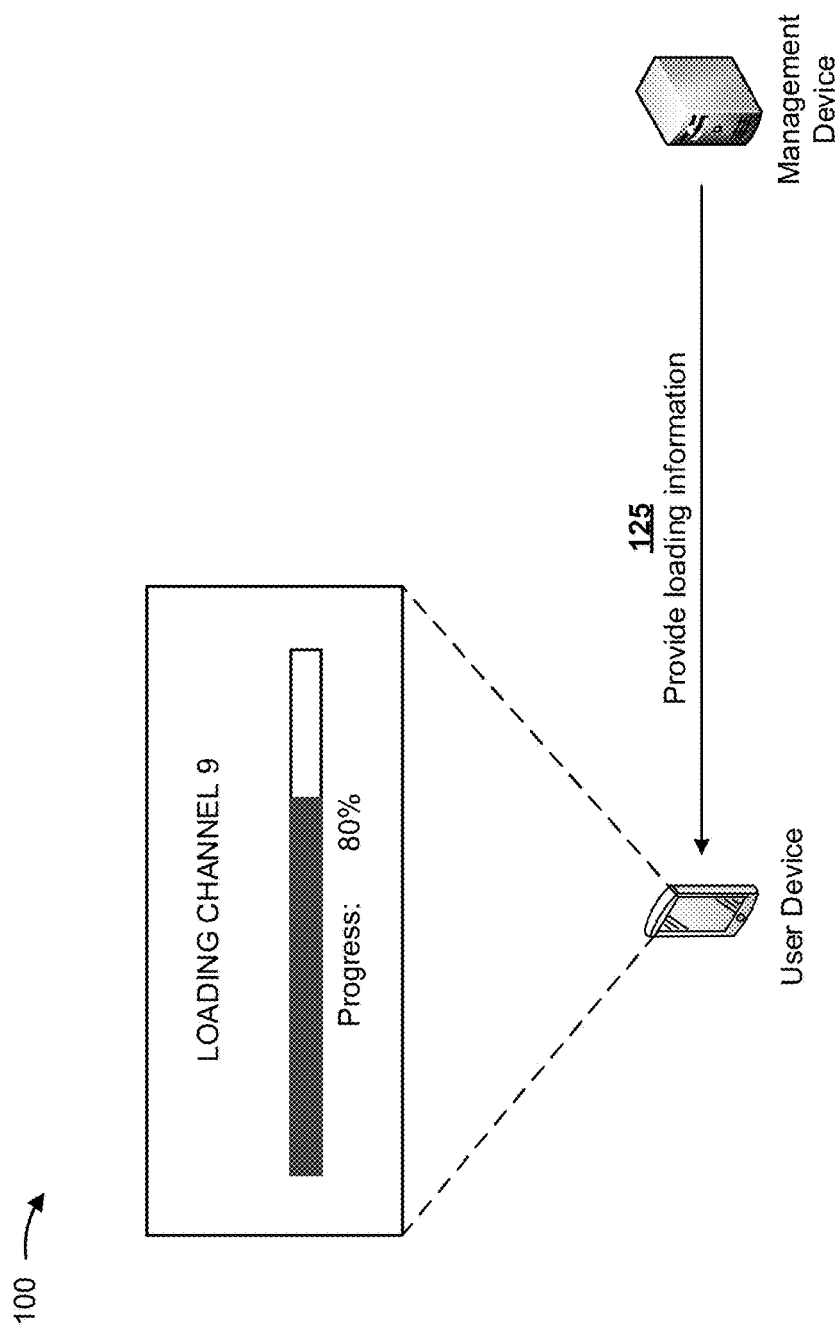

As shown in FIG. 1C, and by reference number 125, the management device may provide loading information to the user device. For example, the loading information may include information that identifies that the channel is being activated. Additionally, the user device may provide, for display, information that identifies that the channel is being loaded. In this way, a user may determine that the channel is available.

Figure 1D:
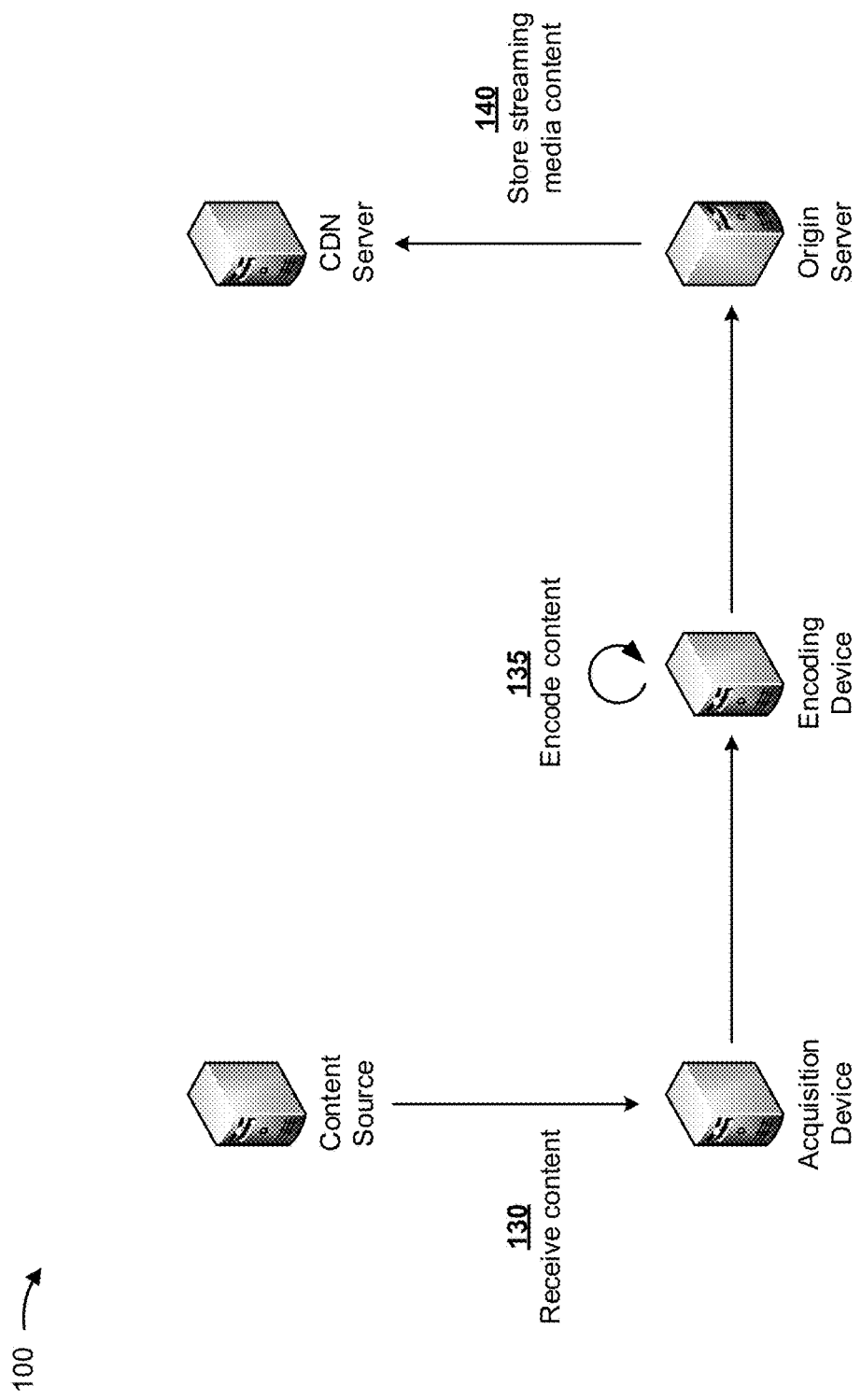

FIG. 1D shows an example of channel acquisition. For example, as shown in FIG. 1D, and as shown by reference number 130, the acquisition device may receive streaming media content from a content source as part of the channel activation. As shown by reference number 135, an encoding device (e.g., a server device) may encode the streaming media content received by the acquisition device, and may provide encoded content to an origin server. As shown by reference number 140, the origin server may provide the content for storage by a CDN server.

Figure 1E:
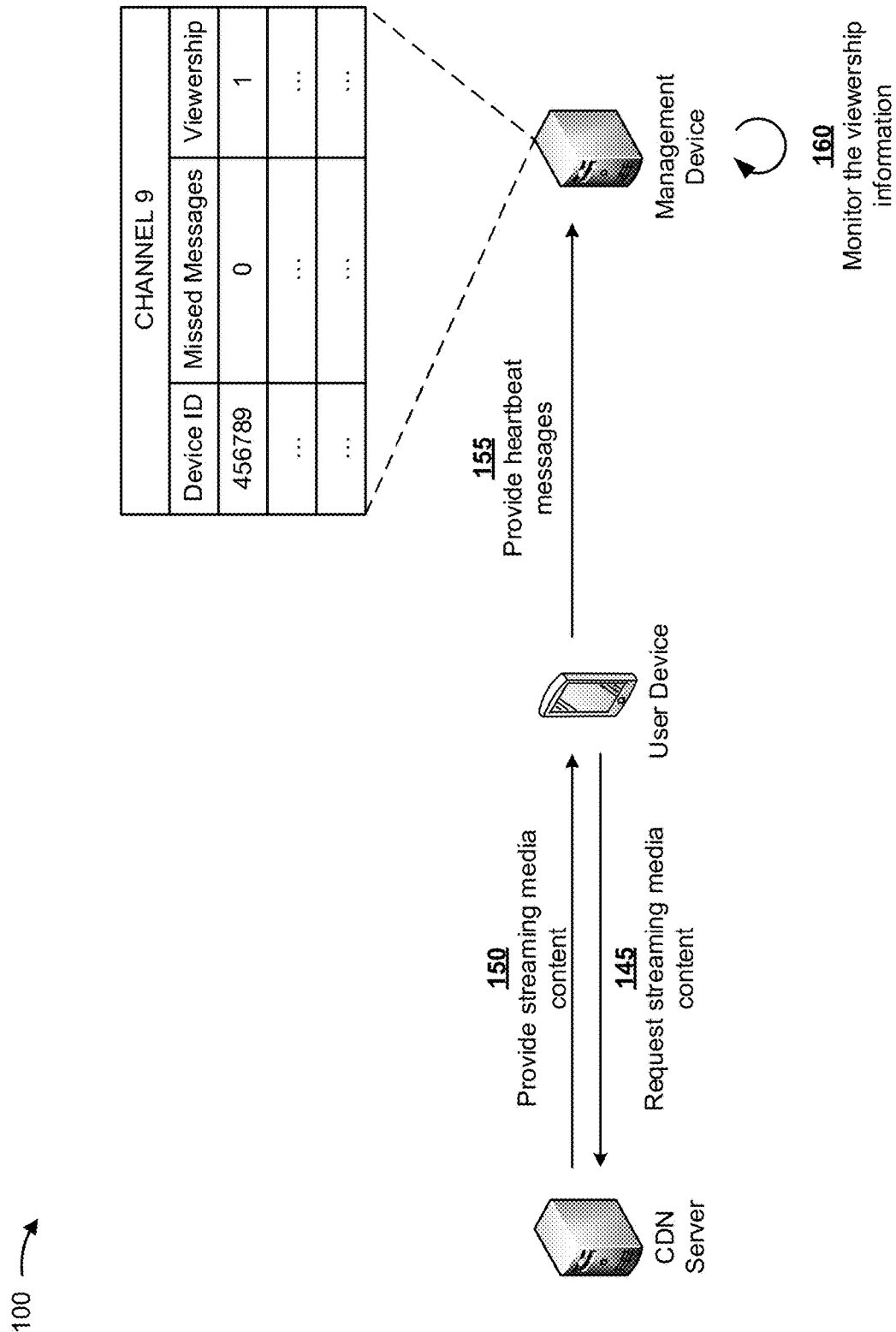

As shown in FIG. 1E, and by reference number 145, the user device may request streaming media content from the CDN server. For example, the user device may request the streaming media content based on the activation of the channel being completed (e.g., based on the loading information received from the management device). As shown by reference number 150, the CDN server may provide streaming media content to the user device. As shown by reference number 155, the user device may provide heartbeat messages to the management device, and the management device may, as shown by reference number 160, monitor the viewership information based on receiving the heartbeat messages. For example, the heartbeat messages may indicate to the management device that the user device is receiving streaming media content associated with the requested channel, that the user device is tuned to the channel, or the like. The management device may store information in a data structure identifying the user device (e.g., by "Device ID") and a quantity of missed heartbeat messages. For example, the management device may determine a quantity of missed heartbeat messages based on comparing an actual quantity of received heartbeat messages and an expected quantity of heartbeat messages for a particular time frame (e.g., interval). The data structure may also store information that identifies a quantity of user devices that are tuned to the channel, and that may be adjusted based on a quantity of missed heartbeat messages.

Figure 1F:
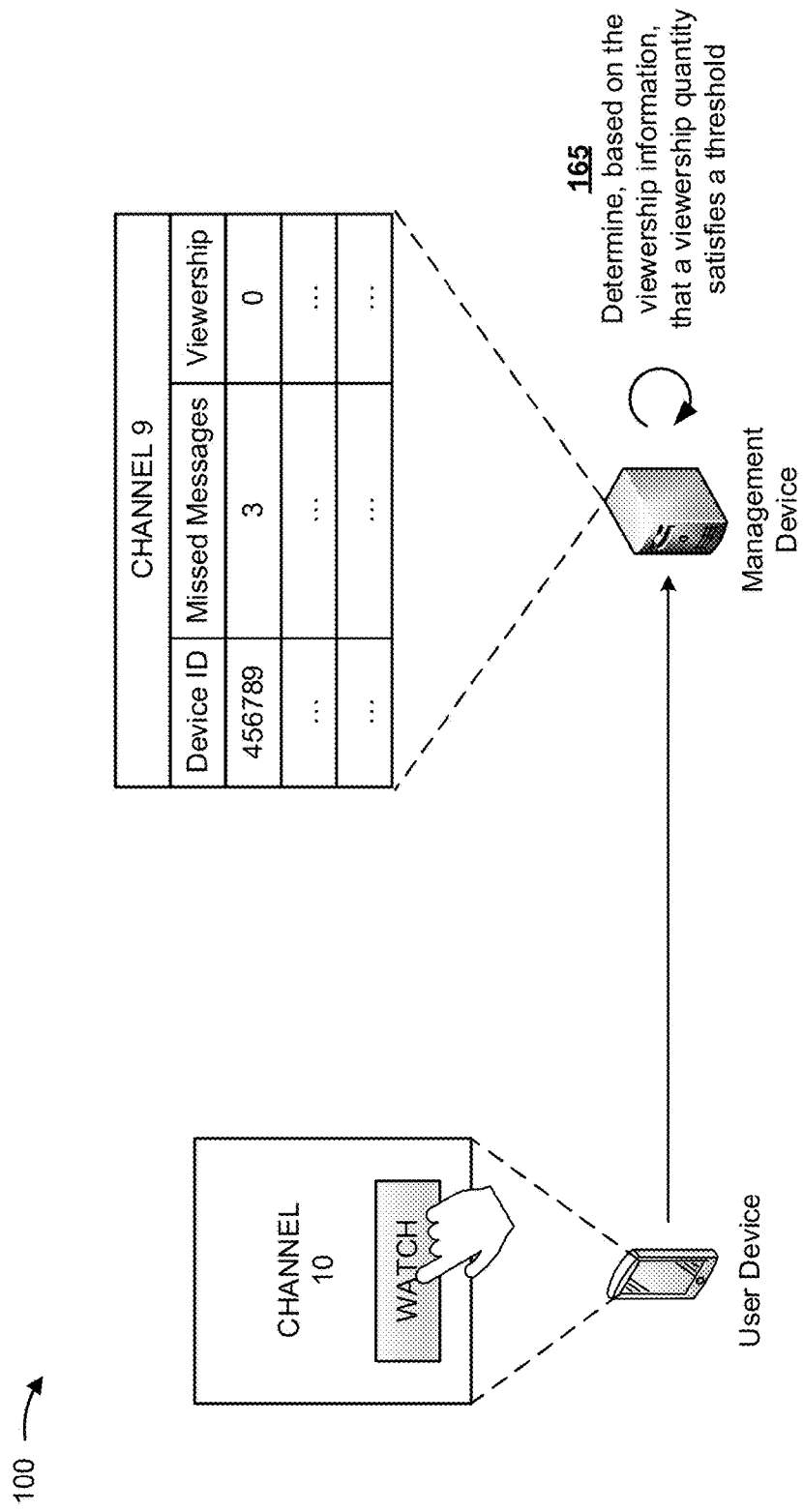

As shown in FIG. 1F, the user device may receive an input identifying an instruction to view content associated with a different channel (e.g., "Channel 10"). Thus, the user device may discontinue sending, to the management device, heartbeat messages that indicate that the user device is receiving content associated with Channel 9. Accordingly, the management device may update the data structure for Channel 9. For example, the management device may update the viewership value in the data structure to indicate that the user device is no longer receiving streaming media content associated with the channel (e.g., "Channel 9"). As shown by reference number 165, the management device may determine, based on the viewership information, that a viewership quantity satisfies a threshold (e.g., has dropped below a threshold).

Figure 1G:
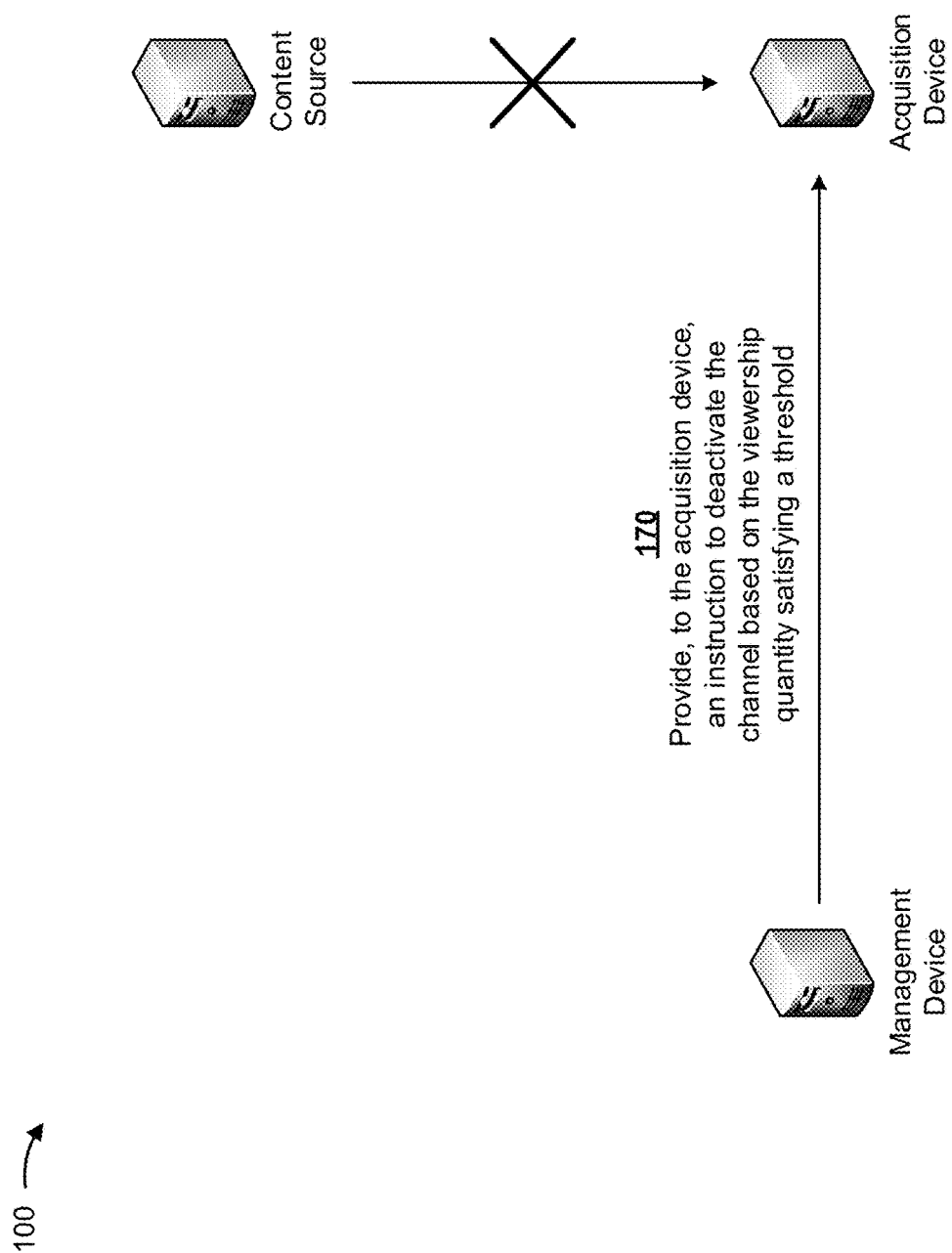

As shown in FIG. 1G, and by reference number 170, the management device may provide, to the acquisition device, an instruction to deactivate the channel based on the viewership quantity satisfying the threshold. Based on receiving the instruction, the acquisition device may discontinue receiving streaming media content associated with the channel from the content source. For example, the acquisition device may disconnect from the content source. In this way, resources that would have been otherwise used for acquisition, encoding, and/or storage of content are conserved. For example, devices associated with acquiring content, encoding the content, storing, and/or transmitting the encoded content may conserve processor and/or memory resources, and network resources may be conserved.

As indicated above, FIGS. 1A-1G are provided merely as an example. Other examples are possible and may differ from what was described with regard to FIGS. 1A-1G.

Figure 2:
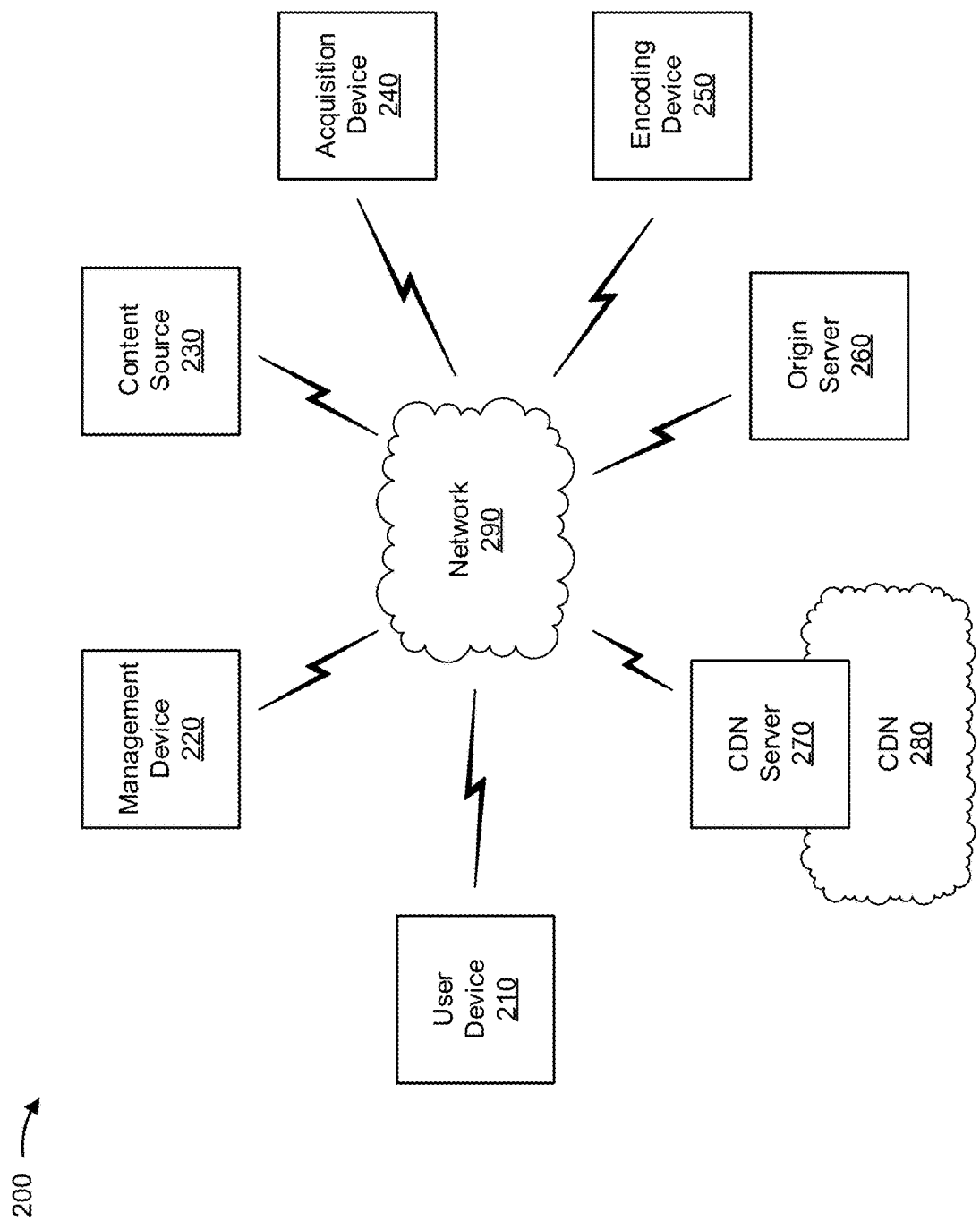
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a management device 220, a content source 230, an acquisition device 240, an encoding device 250, an origin server 260, a CDN server 270, a CDN 280, and a network 290. Devices of environment 200 may interconnect via wired connections, wireless connections, or a combination of wired and wireless connections.

User device 210 includes one or more devices capable of receiving, generating, storing, processing, and/or providing information associated with streaming media content. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a set-top box, or a similar type of device.

Management device 220 includes one or more devices capable of receiving, processing, storing, and/or providing viewership information associated with a channel. For example, management device 220 may include a computing device, such as a server (e.g., an application server, a host server, a web server, a hypertext transfer protocol (HTTP) server, etc.), a network device, or a similar device. In some implementations, management device 220 may determine viewership information associated with a channel, and may cause the channel to be activated and/or deactivated based on the viewership information.

Content source 230 includes one or more devices capable of receiving, storing, processing, and/or providing information associated with streaming media content. For example, content source 230 may include a computing device, such as a server device or a similar device. In some implementations, content source 230 may provide a stream (e.g., a signal stream) to acquisition device 240.

Acquisition device 240 includes one or more devices capable of receiving, storing, processing, and/or providing information associated with streaming media content. For example, acquisition device 240 may include a computing device, such as a server device or a similar device. In some implementations, acquisition device 240 may receive a stream from content source 230, and may provide the stream to encoding device 250.

Encoding device 250 includes one or more devices capable of receiving, storing, processing, and/or providing information associated with streaming media content. For example, encoding device 250 may include a computing device, such as a server device or a similar device. In some implementations, encoding device 250 may encode a stream, may partition the stream into segments, and may provide streaming media content (e.g., files associated with the segments of the streaming media content) to origin server 260.

Origin server 260 includes one or more devices capable of receiving, storing, processing, and/or providing streaming media content (e.g., one or more segments of streaming media content). For example, origin server 260 may include a storage device, a server, or a similar device. In some implementations, origin server 260 may store streaming media content, and/or may provide the streaming media content to CDN servers 270 (e.g., for distribution to user devices 210).

CDN server 270 includes one or more devices capable of receiving, storing, processing, and/or providing information associated with streaming media content. For example, CDN server 270 may include a computing device, such as a server device or a similar device. In some implementations, CDN server 270 may receive streaming media content from origin server 260, may store the streaming media content, and may provide the streaming media content to user device 210.

CDN 280 includes one or more wired and/or wireless networks of devices that are capable of receiving, storing, processing, and/or providing streaming media content (e.g., one or more segments of the streaming media content). CDN 280 may include, for example, servers, data centers, or the like.

Network 290 includes one or more wired and/or wireless networks. For example, network 290 may include a cellular network (e.g., a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
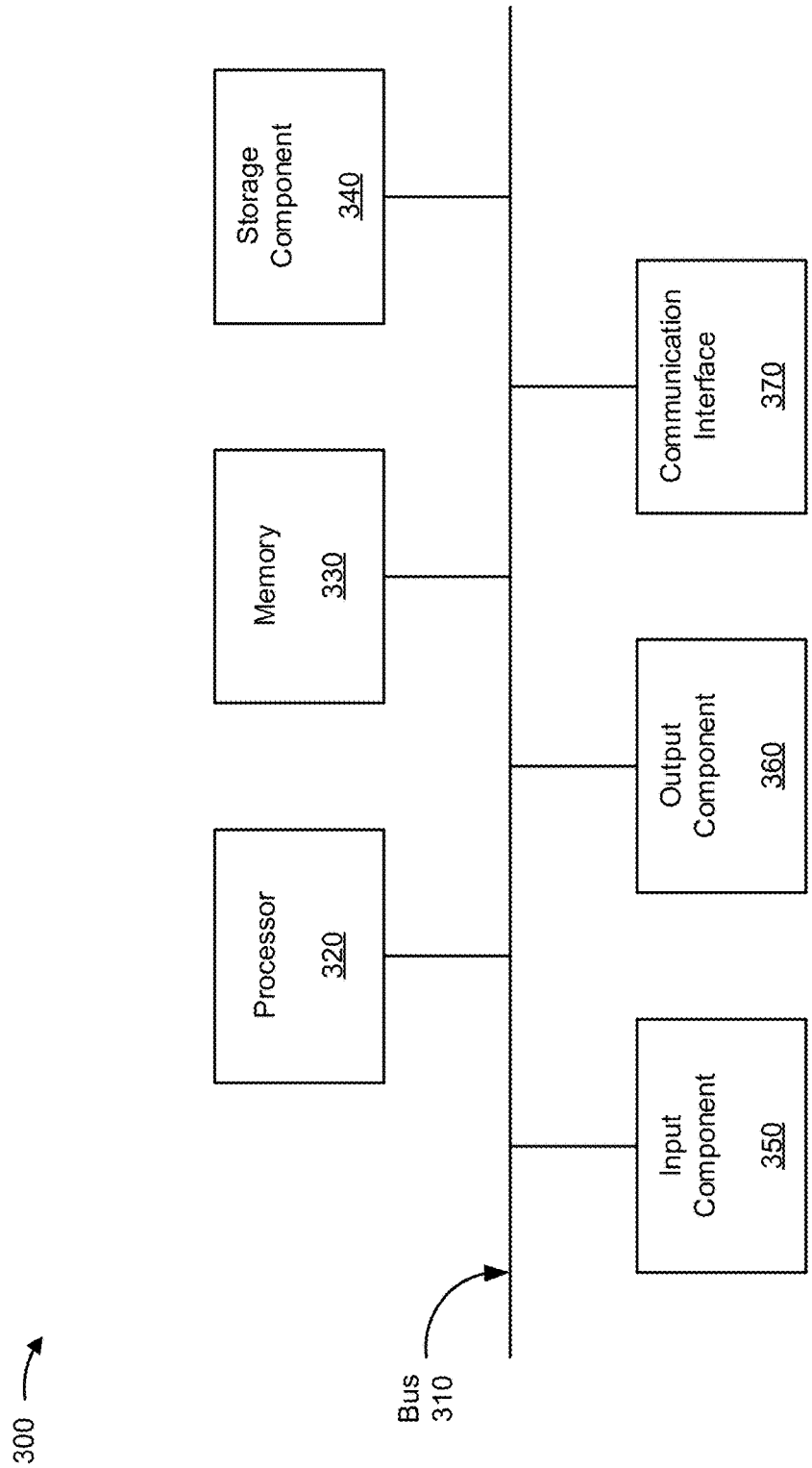
FIG. 3 is a diagram of example components of one or more devices of FIG. 2.

FIG. 3 is a diagram of example components of a device 300. Device 300 may correspond to user device 210, management device 220, content source 230, acquisition device 240, encoding device 250, origin server 260, and/or CDN server 270. In some implementations, user device 210, management device 220, content source 230, acquisition device 240, encoding device 250, origin server 260, and/or CDN server 270 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
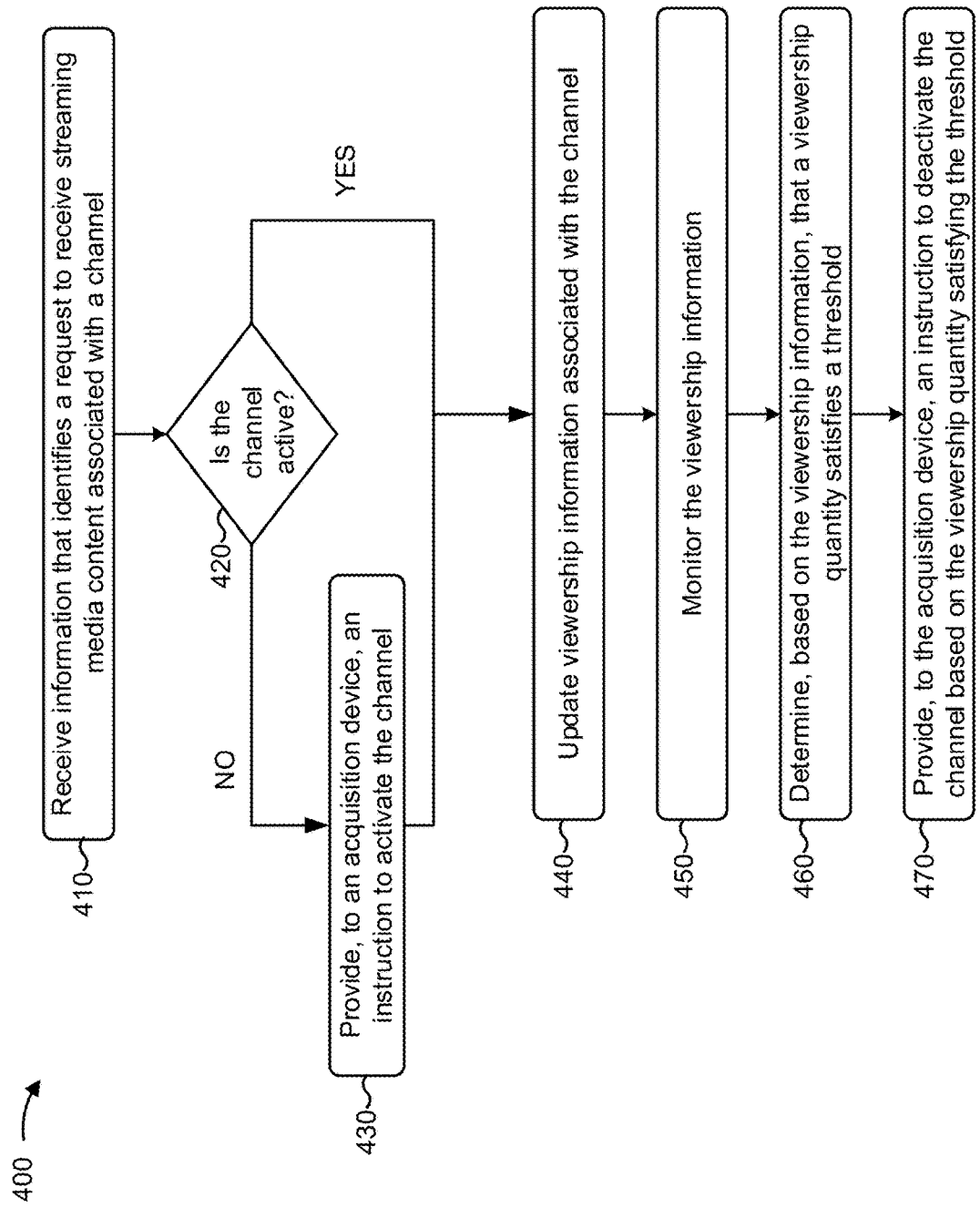
FIG. 4 is a flow chart of an example process for managing channel acquisition based on viewership information.

FIG. 4 is a flow chart of an example process 400 for managing channel acquisition based on viewership information. In some implementations, one or more process blocks of FIG. 4 may be performed by management device 220. In some implementations, one or more process blocks of FIG. 4 may be performed by another device or a group of devices separate from or including management device 220, such as user device 210, content source 230, acquisition device 240, encoding device 250, origin server 260, and/or CDN server 270.

As shown in FIG. 4, process 400 may include receiving information that identifies a request to receive streaming media content associated with a channel (block 410). For example, management device 220 may receive information that identifies a request, by user device 210, to receive streaming media content associated with a channel. In some implementations, streaming media content may include video content (e.g., live television, live video, IPTV content, video on demand (VOD) content, high definition (HD) VOD content, high definition three-dimensional (HD3D) VOD content, television (TV) programming, movies, on-demand services, commercials, advertisements, instructions, etc.), audio content (e.g., music, radio content, a podcast, an audiobook, or the like), or any other content that may be provided through a continuous flow of data. In some implementations, a channel may carry streaming media content, and/or may identify particular streaming media content. In some implementations, user device 210 may tune to a channel (e.g., based on a user input), may request to receive streaming media content associated with the channel, and/or may process the streaming media content for output (e.g., may provide information for display, for output via a speaker, or the like).

In some implementations, the request may include a resource identifier (e.g., a uniform resource identifier (URI), such as a uniform resource locator (URL), or the like) that may allow user device 210 to access the streaming media content. In some implementations, user device 210 may receive (e.g., from origin server 260, CDN server 270, management device 220, and/or another device) a catalog of content from which particular streaming media content may be selected. Additionally, or alternatively, user device 210 may request particular streaming media content based on the catalog (e.g., may request to receive streaming media content associated with a particular channel).

In some implementations, user device 210 may receive a manifest file that includes multiple resource identifiers (e.g., an HTTP Live Stream (HLS) manifest file, a Dynamic Adaptive Streaming over HTTP (DASH) Media Presentation Description (MPD) file, etc.). As described herein, a manifest file may include information that identifies available segments and resource identifiers (e.g., URLs) for requesting segments associated with streaming media content. In some implementations, a manifest file may include resource identifiers associated with multiple CDNs 280. In some implementations, user device 210 may receive a manifest file from origin server 260, CDN server 270, or the like. In some implementations, user device 210 may request a segment of the streaming media content using a request (e.g., an HTTP request, such as an HTTP GET request, or the like). For example, user device 210 may request streaming media content by requesting segments of the streaming media content (e.g., using HLS, DASH, HTTP Dynamic Streaming, HTTP Adaptive Streaming, Microsoft® Smooth Streaming, or the like). Based on the particular resource identifier (or resource identifiers) used by user device 210, a particular CDN 280 and/or CDN server 270 may provide the requested streaming media content to user device 210.

In some implementations, user device 210 may provide, to CDN server 270, a request to receive streaming media content associated with the channel. For example, user device 210 may provide, to CDN server 270, requests for segments of the streaming media content. If the requested streaming media content (e.g., one or more requested segments) is stored by CDN server 270, then CDN server 270 may provide the requested streaming media content to user device 210. Alternatively, if the requested streaming media content is not stored by CDN server 270, then CDN server 270 may obtain the requested streaming media content from origin server 260 (e.g., by requesting and receiving the streaming media content), may store the streaming media content, and may provide the streaming media content to user device 210. In some implementations, CDN server 270 may store the streaming media content (e.g., for a particular period of time) so that the streaming media content is available on CDN server 270 for user device 210 and/or other user devices 210.

In some implementations, if the requested streaming media content is not stored by origin server 260 (and/or CDN server 270), then origin server 260 may provide, to management device 220, information that identifies the request to receive the streaming media content associated with the channel. In this case, management device 220 may provide, to acquisition device 240, an instruction to activate the channel associated with the streaming media content, as described in connection with block 430.

In some implementations, management device 220 may receive information that identifies the request based on user device 210 requesting the streaming media content. Additionally, or alternatively, management device 220 may receive information that identifies the request based on CDN server 270 requesting the streaming media content from origin server 260. Additionally, or alternatively, management device 220 may receive, from origin server 260, information that identifies the request (e.g., based on origin server 260 not storing the streaming media content). Additionally, or alternatively, management device 220 may receive information that identifies the request based on CDN server 270 providing the streaming media content to user device 210, and/or origin server 260 providing the streaming media content to user device 210.

As further shown in FIG. 4, process 400 may include determining whether the channel is active based on the information that identifies the request (block 420). For example, management device 220 may determine whether the channel, associated with the streaming media content, is active. In some implementations, a channel may be active when streaming media content, associated with the channel, is stored by origin server 260 and/or CDN server 270. Additionally, or alternatively, a channel may be active when signals, associated with content source 230, are being encoded by encoding device 250, and/or when streaming media content associated with the signals is being provided to origin server 260 and/or CDN server 270 (e.g., for distribution to user devices 210). For example, acquisition device 240 may receive signals from content source 230 (e.g., may receive streams, such as real time streaming protocol (RTSP) streams, broadcast TV signal streams, analog TV signal streams, radio signal streams, video signal streams, etc.), and may provide the signals to encoding device 250.

In some implementations, encoding device 250 may encode and/or transcode the signals associated with the streaming media content (e.g., may encode the signals using an MPEG codec, such as an MPEG-2, MPEG-4 codec, or the like), may compress the streaming media content, may encode the streaming media content at a particular bit-rate and/or multiple different bit-rates, or the like. Additionally, or alternatively, encoding device 250 may partition the streaming media content into segments that correspond to different time intervals of the media stream. In this way, each encoded segment may be stored as a file by origin server 260 and/or CDN server 270, and/or provided to user device 210. For example, each segment may be stored as a TS file, and may be requested using a particular resource identifier (e.g., associated with a manifest file).

In some implementations, management device 220 may include a data structure (e.g., a lookup table, or the like) that stores viewership information associated with a channel. For example, the viewership information may include information that identifies a channel (e.g., a channel identifier, or the like). Additionally, or alternatively, management device 220 may store viewership information associated with the channel, such as whether streaming media content, associated with the channel, is stored by origin server 260 and/or CDN server 270, and/or whether acquisition device 240 is receiving, from content source 230, a media stream associated with the channel. Additionally, or alternatively, the viewership information may include information associated with user devices 210 (e.g., user devices 210 that have requested streaming media content, user devices 210 that are accessing the channel, or the like). For example, management device 220 may store information associated with a device identifier of user device 210 (e.g., a mobile directory number (MDN), an international mobile subscriber identifier (IMSI), an IP address, a Media Access Control (MAC) address, or the like).

Additionally, or alternatively, the viewership information may include information that identifies a quantity of user devices 210 that are accessing streaming media content associated with the channel, that are tuned to the channel, that have requested streaming media content associated with the channel, or the like. Additionally, or alternatively, the viewership information may include temporal information (e.g., information that identifies a time of day, a day of the month, a month, a season, etc.) associated with the request (or requests). In some implementations, management device 220 may receive, from user device 210, acquisition device 240, origin server 260, and/or CDN server 270, information associated with the channel, and may update stored viewership information based on the information associated with the channel.

In some implementations, management device 220 may determine whether the channel is active based on viewership information associated with the channel. For example, management device 220 may perform a lookup using the data structure, and may identify whether the channel is active (e.g., based on a quantity of user devices 210 that are accessing the streaming media content, whether streaming media content is stored by origin server 260 and/or CDN server 270, and/or whether streaming media content is capable of being provided to user devices 210, or the like).

As shown in FIG. 4, process 400 may include providing, to an acquisition device, an instruction to activate the channel (block 430). For example, if management device 220 determines that the channel is not active (block 420—NO), then management device 220 may provide, to acquisition device 240, an instruction to activate the channel. In some implementations, activating the channel may refer to the process of acquiring a stream (e.g., associated with content source 230), and storing streaming media content, associated with the stream, for distribution to user devices 210. As an example, management device 220 may provide, to acquisition device 240, a message that causes acquisition device 240 to acquire the stream. For example, activating the channel may include steps described above in connection with block 420.

In some implementations, management device 220 may provide loading information to user device 210 based on providing the instruction to activate the channel. For example, loading information may include information that identifies that the channel is being activated. In some implementations, management device 220 may provide a file (e.g., TS file) that includes the loading information. For example, the loading information may include a video (e.g., a loopback video) that identifies the channel (e.g., includes a logo associated with the channel, includes content associated with the channel, or the like). In some implementations, user device 210 may receive the loading information, and may provide information for display that identifies the loading information. In this way, a user may view a video associated the loading information, and may determine that the channel is being activated and/or that the channel may be available for viewing. Additionally, in this way, the loading information may notify a user that the channel is available, which may reduce a quantity of instances where a user tunes to another channel (e.g., based on determining that the channel may not be available, based on determining that an error has occurred, or the like). In this way, processor and/or memory resources of user device 210, management device 220, origin server 260 and/or CDN server 270 may be conserved based on reducing a quantity of instances where user device 210 requests streaming media content associated with a channel and then tunes to another channel (e.g., while the channel is being activated). Additionally, in this way, network resources may be conserved.

In some implementations, management device 220, origin server 260, and/or CDN server 270 may provide the streaming media content to user device 210 (e.g., based on the channel being active). For example, user device 210 may receive a manifest file that identifies multiple segments of the streaming media content, and may request particular segments based on the manifest file (e.g., using HLS, DASH, HTTP Dynamic Streaming, HTTP Adaptive Streaming, Microsoft® Smooth Streaming, or the like).

As further shown in FIG. 4, process 400 may include updating viewership information associated with the channel (block 440). For example, if management device 220 determines that the channel is active (block 420—YES) and/or if management device 220 provides the instruction to activate the channel (block 430), then management device 220 may update viewership information associated with the channel. For example, management device 220 may update viewership information associated with the channel based on receiving the information that identifies the request. In some implementations, management device 220 may update the viewership information (e.g., may update the viewership information associated with the data structure). As an example, management device 220 may increment a quantity of user devices 210 that are accessing the channel based on receiving the information that identifies the request. In this way, management device 220 may store viewership information that identifies a current demand for a particular channel.

As shown in FIG. 4, process 400 may include monitoring the viewership information (block 450). For example, management device 220 may monitor the viewership information (e.g., to identify a quantity of user devices 210 that are tuned to the channel). In some implementations, management device 220 may monitor the viewership information based on the data structure (e.g., based on updating the data structure, such as incrementing or decrementing the quantity of user devices 210 that are tuned to the channel). In some implementations, user device 210 (e.g., an IPTV application associated with user device 210) may provide messages (e.g., heartbeat messages, or the like) to management device 220 based on being tuned to the channel. For example, during playback of the streaming media content, user device 210 may provide, to management device 220, messages that include information identifying that user device 210 is tuned to the channel, that user device 210 is providing the streaming media content for display, or the like. In some implementations, a heartbeat message may indicate that user device 210 is currently tuned to the channel. Additionally, management device 220 may determine that user device 210 is tuned to the channel based on receiving heartbeat messages, and/or continuing to receive heartbeat messages.

In some implementations, the messages may include information identifying a particular segment of the streaming media content that user device 210 is providing for playback, or the like. In some implementations, user device 210 may provide the messages based on an interval (e.g., at a particular interval, such as every thirty seconds, every minute, every five minutes, etc.). In some implementations, user device 210 may provide a particular message that identifies that user device 210 has finished providing the streaming media content for playback (e.g., is no longer requesting additional segments, has requested all available segments, has tuned to another channel, or the like).

In some implementations, management device 220 may determine that user device 210 is no longer tuned to the channel. For example, management device 220 may determine that user device 210 is no longer tuned to the channel based on the messages (e.g., the heartbeat messages). In some implementations, management device 220 may determine that user device 210 is no longer tuned to the channel based on receiving a particular message, such as a message that identifies that user device 210 is no longer tuned to the channel. Additionally, or alternatively, management device 220 may determine that user device 210 is no longer tuned to the channel based on failing to receive a message, a threshold quantity of messages, or the like. As an example, assume that management device 220 fails to receive three consecutive heartbeat messages from user device 210. In this case, management device 220 may determine that user device 210 is no longer tuned to the channel based on the three consecutive heartbeat messages. In some implementations, management device 220 may receive a particular quantity of messages from user device 210, and may determine that user device 210 is no longer tuned to the channel based on the particular quantity. In some implementations, management device 220 may decrement a viewership quantity (e.g., a value representing a quantity of user devices 210 tuned to the channel) based on determining that user device 210 is no longer tuned to the channel. In some implementations, management device 220 may update the viewership information based on incrementing the viewership quantity, decrementing the viewership quantity, determining that user device 210 is still tuned to the channel, etc.

As further shown in FIG. 4, process 400 may include determining, based on the viewership information, that a viewership quantity satisfies a threshold (block 460). For example, management device 220 may determine that a viewership quantity satisfies a threshold based on a quantity of user devices 210 that are tuned to the channel. In some implementations, the threshold may be a quantity that is greater than zero.

In some implementations, the threshold may be based on a temporal indicator. As an example, a particular channel may be associated with a first threshold for a first temporal indicator (e.g., a first time of day, such as morning, a first day, such as Monday, etc.), and may be associated with a second threshold for a second temporal indicator (e.g., a second time of day, such as evening, a second day, such as Sunday, or the like). Additionally, or alternatively, the threshold may be based on the channel. As an example, a particular channel may be associated with a first threshold, and a second channel may be associated with a second threshold that is different than the first threshold. In some implementations, management device 220 may determine that the viewership quantity satisfies the threshold based on a quantity of user devices 210 that are tuned to the channel. For example, management device 220 may compare the viewership quantity with the threshold, and may determine that the viewership quantity satisfies the threshold based on the comparison.

In some implementations, management device 220 may determine the threshold based on one or more techniques (e.g., algorithms, machine learning, computational statistics, artificial intelligence, etc.). For example, management device 220 may implement a technique that associates viewership information (e.g., historical viewership information, temporal indicators associated with the viewership information, or the like) and/or thresholds with temporal indicators. In some implementations, the technique may receive, as input, information identifying known viewership information, known thresholds, and/or known temporal indicators, and may correlate the known viewership information, the known thresholds, and/or the known temporal indicators (e.g., using machine learning, computational statistics, artificial intelligence, or the like). Additionally, or alternatively, management device 220 may receive viewership information and thresholds to be used in association with the technique (e.g., to train a model, or the like). In this way, management device 220 may determine thresholds based on the technique (e.g., using the model), may determine viewership patterns (e.g., times and/or dates at which user devices 210 are likely to tune to or away from particular channels, or the like).

As further shown in FIG. 4, process 400 may include providing, to the acquisition device, an instruction to deactivate the channel based on the viewership quantity satisfying the threshold (block 470). For example, management device 220 may provide, to acquisition device 240, an instruction to deactivate the channel based on the viewership quantity satisfying the threshold. In some implementations, deactivating the channel may refer to the process of ceasing to receive signals from content source 230, encode the signals, and/or store the streaming media content by origin server 260 and/or CDN server 270. For example, based on the instruction, acquisition device 240 may cease to acquire, from content source 230, signals associated with a media stream. In other words, management device 220 may prevent acquisition device 240 from receiving streaming media content from content source 230 based on the instruction to deactivate the channel. As a result, acquisition device 240 may conserve processor and/or memory resources based on reducing a quantity of instances where acquisition device 240 is receiving a media stream from content source 230. Additionally, or alternatively, encoding device 250 may conserve processor and/or memory resources based on reducing an amount of encoding of signals received from acquisition device 240 and/or content source 230. Additionally, or alternatively, origin server 260 may conserve processor and/or memory resources based on reducing an amount of streaming media content to be stored. Additionally, or alternatively, CDN server 270 may conserve processor and/or memory resources based on reducing an amount of streaming media content to be stored. Additionally, or alternatively, network resources may be conserved based on the foregoing. In this way, management device 220 may instruct acquisition device 240 to activate and/or deactivate a channel based on a demand for the channel (e.g., based on viewership information). In this way, network resources may be allocated based on actual demand of a channel.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As described herein, resources that would have been otherwise used for acquisition, encoding, and/or storage of content are conserved. For example, implementations described herein may reduce a quantity of instances where network devices are acquiring content, encoding the content, storing, and/or transmitting the encoded content despite low viewership. As an example, network devices may not acquire a particular channel when demand for the channel satisfies a threshold. In this way, network resources may be conserved and/or may be more prudently allocated.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors to:
receive information that identifies a request, by a user device, to receive streaming media content associated with a first channel;
cause the first channel to be activated based on the request and based on viewership data,
the viewership data including information as to whether the streaming media content associated with the first channel is stored by a content delivery network (CDN) server,
where the one or more processors when causing the first channel to be activated are to:
cause the CDN server to:
store the streaming media content associated with the first channel, and
provide the streaming media content associated with the first channel to the user device;
receive, from the user device, a quantity of heartbeat messages associated with the first channel based on the first channel being activated,
the user device to receive the streaming media content associated with the first channel;
determine, after receiving the quantity of heartbeat messages, that the user device failed to provide another heartbeat message associated with the first channel based on comparing an expected quantity of heartbeat messages to the quantity of heartbeat messages;
determine, based on determining that the user device failed to provide the other heartbeat message associated with the first channel, that the user device is not tuned to the first channel and is tuned to a second channel;

decrement a viewership quantity associated with the first channel based on determining that the user device failed to provide the other heartbeat message associated with the first channel, the viewership quantity associated with the first channel being indicative of a quantity of user devices that are tuned to or accessing the first channel; and cause the first channel to be deactivated based on the user device not being tuned to the first channel and the viewership quantity associated with the first channel satisfying a threshold, where the one or more processors, when causing the first channel to be deactivated, are to:

cause the CDN server to cease storing the streaming media content associated with the first channel.

2. The device of claim 1, where the one or more processors are further to:

provide, to an acquisition device, an instruction to acquire the streaming media content associated with the first channel; and where the one or more processors, when causing the first channel to be activated, are to:

cause the first channel to be activated based on the instruction to acquire the streaming media content associated with the first channel.

3. The device of claim 1, where the one or more processors are further to:

compare the quantity of heartbeat messages associated with the first channel to the expected quantity of heartbeat messages associated with the first channel, the expected quantity of heartbeat messages associated with the first channel being associated with an interval, and the quantity of heartbeat messages associated with the first channel being received in association with the interval.

4. The device of claim 1, where the one or more processors are further to:

cause loading information to be provided to the user device based on causing the first channel to be activated.

5. The device of claim 1, where the one or more processors are further to:

provide, to an acquisition device, an instruction to deactivate the first channel based on the user device not being tuned to the first channel; and where the one or more processors, when causing the first channel to be deactivated, are to:

cause the first channel to be deactivated based on the instruction.

6. The device of claim 1, where the one or more processors are further to:

receive a quantity of heartbeat messages associated with the second channel.

7. The device of claim 1, where the first channel is an Internet protocol television channel.

8. A non-transitory computer-readable medium storing instructions, the instructions comprising:

one or more instructions that, when executed by one or more processors of a device, cause the one or more processors to:

receive information that identifies a request, by a user device, to receive streaming media content associated with a first channel;

cause the first channel to be activated based on the request and based on viewership data, the viewership data including information as to whether the streaming media content associated with the first channel is stored by a content delivery network (CDN) server, where the one or more instructions, that cause the one or more processors to cause the first channel to be activated, cause the one or more processors to:

cause the CDN server to:

store the streaming media content associated with the first channel, and provide the streaming media content associated with the first channel to the user device;

receive, from the user device, a quantity of heartbeat messages associated with the first channel based on the first channel being activated, determine, after receiving the quantity of heartbeat messages, that the user device failed to provide another heartbeat message associated with the first channel based on comparing an expected quantity of heartbeat messages to the quantity of heartbeat messages;

determine, based on the user device failing to provide the other heartbeat message associated with the first channel, that the user device is not tuned to the first channel and that the user device changed to being tuned to a second channel;

decrement a viewership quantity associated with the first channel based on determining that the user device failed to provide the other heartbeat message associated with the first channel, the viewership quantity associated with the first channel being indicative of a quantity of user devices that are tuned to or accessing the first channel; and cause the first channel to be deactivated based on the user device not being tuned to the first channel and the viewership quantity associated with the first channel satisfying a threshold, where the one or more instructions, that cause the one or more processors to cause the first channel to be deactivated, cause the one or more processors to:

cause the CDN server to cease storing the streaming media content associated with the first channel.

9. The non-transitory computer-readable medium of claim 8, where the one or more instructions, when executed by the one or more processors, further cause the one or more processors to:

determine the viewership quantity based on determining that the user device is not tuned to the first channel.

10. The non-transitory computer-readable medium of claim 8, where the one or more instructions, when executed by the one or more processors, further cause the one or more processors to:

receive, from a server device, information that identifies that the streaming media content associated with the first channel is not stored by the server device;

provide, to an acquisition device, an instruction to activate the first channel, the instruction to cause the acquisition device to receive signals, associated with the streaming media content, from a content source; and where the one or more instructions, that cause the one or more processors to cause the first channel to be activated, cause the one or more processors to:

cause the first channel to be activated based on the instruction.

11. The non-transitory computer-readable medium of claim 8, where the one or more instructions, when executed by the one or more processors, further cause the one or more processors to:

determine a temporal indicator; and where the one or more instructions, that cause the first channel to be deactivated, cause the one or more processors to:

cause the first channel to be deactivated based on the temporal indicator.

12. The non-transitory computer-readable medium of claim 8, where the one or more instructions, when executed by the one or more processors, further cause the one or more processors to:

provide, to the user device, loading information based on the information that identifies the request.

13. The non-transitory computer-readable medium of claim 8, wherein, after decrementing the viewership quantity, the quantity of user devices that are tuned to or accessing the first channel is zero.

14. A method, comprising:

receiving, by a device, information that identifies a request, by a user device, to receive streaming media content associated with a first channel;

causing, by the device, the first channel to be activated based on the request and based on viewership data, the viewership data including information as to whether the streaming media content associated with the first channel is stored by a content delivery network (CDN) server, where causing the first channel to be activated comprises:

causing the CDN server to:

store the streaming media content associated with the first channel, and provide the streaming media content associated with the first channel to the user device;

receiving, by the device and from the user device, a quantity of heartbeat messages associated with the first channel based on the first channel being activated;

determining, by the device and after receiving the quantity of heartbeat messages, that the user device failed to provide another heartbeat message associated with the first channel based on comparing an expected quantity of heartbeat messages to the quantity of heartbeat messages;

determining, by the device and based on determining that the user device failed to provide the other heartbeat message associated with the first channel, that the user device is not accessing the first channel and that the user device is tuned to a second channel;

decrementing, by the device, a viewership quantity associated with the first channel based on determining that the user device failed to provide the other heartbeat message associated with the first channel, the viewership quantity associated with the first channel being indicative of a quantity of user devices that are tuned to or accessing the first channel; and deactivating, by the device, the first channel based on the user device not accessing the first channel and the viewership quantity associated with the first channel satisfying a threshold, where causing the first channel to be deactivated comprises:

causing the CDN server to cease storing the streaming media content associated with the first channel.

15. The method of claim 14, further comprising:

determining, based on the request, that the first channel is not active;

providing, to the user device, loading information based on the first channel not being active, the loading information indicating a progress for activating the first channel; and providing, to another device, an instruction to activate the first channel.

16. The method of claim 14, further comprising:

providing, to another device, an instruction to acquire the streaming media content associated with the first channel; and where causing the first channel to be activated comprises:

causing the first channel to be activated based on the instruction.

17. The method of claim 14, further comprising:

providing, to another device, an instruction to prevent the other device from receiving the streaming media content associated with the first channel; and where deactivating the first channel comprises:

deactivating the first channel based on the instruction.

18. The method of claim 14, further comprising:

determining the viewership quantity based on the user device not accessing the first channel.

19. The method of claim 14, further comprising:

comparing the quantity of heartbeat messages associated with the first channel to the expected quantity of heartbeat messages associated with the first channel for an interval.

20. The method of claim 14, wherein, after decrementing the viewership quantity, the quantity of user devices that are tuned to or accessing the first channel is zero.

* * * * *